(12) United States Patent
Heuft

(10) Patent No.: US 10,407,255 B2
(45) Date of Patent: Sep. 10, 2019

(54) TRANSPORTER HAVING A TILTABLE WEB

(71) Applicant: HEUFT SYSTEMTECHNIK GMBH, Burgbrohl (DE)

(72) Inventor: Bernhard Heuft, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 15/570,642

(22) PCT Filed: May 2, 2016

(86) PCT No.: PCT/EP2016/059797
§ 371 (c)(1),
(2) Date: Oct. 30, 2017

(87) PCT Pub. No.: WO2016/174273
PCT Pub. Date: Nov. 3, 2016

(65) Prior Publication Data
US 2018/0290840 A1 Oct. 11, 2018

(30) Foreign Application Priority Data
Apr. 30, 2015 (DE) .......................... 10 2015 005 508

(51) Int. Cl.
B65G 47/88 (2006.01)

(52) U.S. Cl.
CPC .. *B65G 47/8869* (2013.01); *B65G 2201/0244* (2013.01)

(58) Field of Classification Search
CPC ...... B07C 5/38; B65G 47/268; B65G 47/8869
(Continued)

(56) References Cited

U.S. PATENT DOCUMENTS 2,096,772 A    10/1937   Webster
2,260,611 A *  10/1941   Di Santo ................. B23Q 7/00
                                                      198/464.2
(Continued)

FOREIGN PATENT DOCUMENTS

CN    102514076 A  *  6/2012
DE    22 18 405 A1    10/1973
(Continued)

OTHER PUBLICATIONS

English translation of International Preliminary Report on Patentability issued in related application PCT/EP2016/059797, dated Nov. 9, 2017, 6 pages.

*Primary Examiner* — Gene O Crawford
*Assistant Examiner* — Lester Ill Rushin
(74) *Attorney, Agent, or Firm* — Drinker Biddle & Reath LLP

(57) ABSTRACT

A device for transporting stationary objects, such as containers, bottles, multipacks, packaged items, which comprises at least one transporting device having a first conveying speed and defines a transport plane for the standing transport of the objects, at least one web arranged parallel to the transporting device, the upper side of the web defines a support plane and the web has a length which is at least equal to double the diameter of the deck surface of the objects to be transported, and at least a lifting device, by which the relative tilting of the support plane of the web relative to the transport plane of the at least one transporting device can be changed, the lifting device allows a step-free tilting of the web and/or transporting device, so that the horizontal position of an intersection line between the support plane and the transport plane is continuously adjustable.

16 Claims, 9 Drawing Sheets

(58) Field of Classification Search
USPC .......................................... 198/586, 607, 809
See application file for complete search history.

(56) References Cited

U.S. PATENT DOCUMENTS

| | | | |
|---|---|---|---|
| 3,217,859 | A | 11/1965 | Bartlo et al. |
| 5,685,414 | A | 11/1997 | Nerenhausen, Sr. |
| 5,810,158 | A | 9/1998 | Schiesser et al. |
| 6,471,044 | B1 * | 10/2002 | Isaacs .................... B65G 43/08 198/347.4 |
| 7,909,159 | B1 * | 3/2011 | Zats ....................... B65G 21/10 198/586 |

FOREIGN PATENT DOCUMENTS

| | | |
|---|---|---|
| DE | 87 01 772 U1 | 5/1987 |
| DE | 39 18 036 A1 | 1/1993 |
| DE | 43 30 235 A1 | 3/1995 |
| DE | 198 16 960 A1 | 11/1999 |
| EP | 0 780 326 A1 | 6/1997 |
| EP | 2 581 331 A1 | 4/2013 |
| EP | 2 765 098 A1 | 8/2014 |
| WO | 88/07969 A1 | 10/1988 |
| WO | 99/41167 A1 | 8/1999 |
| WO | 2006/098726 A1 | 9/2006 |

\* cited by examiner

TRANSPORTER HAVING A TILTABLE WEB

CROSS-REFERENCE TO RELATED APPLICATIONS

This application is the U.S. national phase of the International Patent Application No. PCT/EP2016/059797 filed May 2, 2016, which claims the priority benefit of German Application No. 10 2015 005 508.9 filed Apr. 30, 2015, the contents of all being incorporated herein by reference.

BACKGROUND

The present application relates to an apparatus and a method for transporting standing objects such as containers, bottles, multipacks and packaged items on transporting apparatuses which are used in bottle-filling systems. The transporting apparatus comprises a transporting device as well as at least one web, and a lifting device with which the tilt of the web relative to the transporting device can be altered.

It is known from DE-A1-198 16 960 to equip link chain conveyors with brake elements that can be raised and lowered in order to selectively stop objects to be conveyed. The brake elements are preferably arranged in parallel to the transporting direction and can be raised via a suitable hydraulic or pneumatic system in parallel to the transporting direction and above the latter. The length of the brake elements substantially corresponds to the length of individual objects. Individual objects can therefore be raised off the transporting surface of the conveyor with the brake elements, with the result that it is no longer transported further by the continuing conveyor.

From DE-A1-43 30 235 a transporting apparatus is known in which, on both sides of a continuous transporter, lifting units are provided, with which brake bars which are aligned in the longitudinal direction of the conveyor lane can be raised above the bearing plane of the conveyor lane. The bars form a slanting plane, by which the transported packaged items can be raised off the conveyor lane. Again, the length of the bars substantially corresponds to the length of individual objects. Several lifting units can be arranged one behind the other in order to make it possible to stop several packaged goods without dynamic pressure.

SUMMARY

The object of the present invention is to increase the versatility and cost effectiveness of transporting apparatuses, in particular to provide the possibility of being able to better monitor and control the flow of containers and at the same time to reduce friction losses during transport.

The apparatus for transporting standing objects, such as containers, bottles, multipacks and packaged items, comprises at least one transporting device, which has a first conveying speed and defines a transporting plane for the standing transport of the objects. The apparatus furthermore comprises at least one web, which are arranged in parallel to the transporting device in the transporting direction. The upper side of the web defines a supporting plane. The length of the web corresponds to at least twice the cross section of the objects to be transported. A lifting device is provided, with which the tilt of the supporting plane of the web relative to the transporting plane of the at least one transporting device can be altered. The lifting device makes a step-free tilting of the web and/or transporting device possible, with the result that the horizontal position of the intersection line between the supporting plane and the transporting plane is adjustable in a step-free manner.

Objects within the meaning of the present invention can be containers such as glass bottles, plastic bottles, containers, cans, multipacks or other packaged items. These containers are usually substantially rotationally symmetrical and have a circular base. The length of the webs is then at least twice the diameter of the circular base of the containers. However, the objects can also be non-rotationally symmetrical containers which have any desired non-circular base. In this case, the length of the webs must be a multiple of the largest diameter of the base of the containers.

The term transporting devices, as used herein, comprises any type of transporters typically used in the standing transport of the above-specified objects. In order to make a standing transport of objects possible, and in order to prevent the objects from falling over during the transport, the transporters must form a substantially closed transporting surface, on which the objects can stand sufficiently securely. Bottles or cans are preferably transported on endless link chain conveyors or conveyor belts, which are motor-driven via deflection rollers and can be designed both rectilinear and curved. However, the present invention is not limited to the use in link chain conveyors or conveyor belts.

Conventionally used link chains are pulled over slide surfaces of the frame structure. In order to minimize the friction losses that form, special lubricants are used depending on the application. However, the use of lubricants represents an increase in the amount of maintenance required. According to one aspect of the present invention, the individual links of the link chains used can have rollers, on which the link chains can roll over lanes in the frame structure of the transporting apparatus. In order to prevent the link chains from slipping sideways, partition walls are preferably provided between the lanes. The links of the link chain can additionally have lateral rollers, with which they can roll against the lateral partition walls. Through the use of rollers, the friction losses of transporting devices can be additionally reduced.

In a simple embodiment, a transporting apparatus according to the invention can consist, for example, of one transporting device and two webs arranged in parallel on either side of the transporting device. The transporting apparatus can in principle consist of any desired number of transporting devices and webs arranged in parallel. The transporting devices and webs are preferably arranged in alternating sequence transverse to the transporting direction. The transporting devices preferably run in a straight line. However, it is also possible to use the present invention in transporting devices running in a curve.

In principle, both the transporting devices and the webs can be provided with lifting devices for adjusting the tilt and/or the vertical position. Because of the simpler design, however, it is recommended merely to provide the webs with lifting devices. The transporting devices preferably define a transporting plane, on which the objects are conveyed, in normal operation, at a predetermined and optionally settable conveying speed. The conveying speed of all transporting devices can be identical in each case. Alternatively, the individual transporting devices can each be operated at an individually settable speed.

In the case of circulating transporting devices, such as conveyor belts or link chain conveyors, the individual conveyor belts can be equipped with conventional drive devices, such as servo motors or other electric motors. The transporting devices can additionally be coupled together, with the result that one motor drives several transporting devices at the same time. In order to actuate the conveyor belts individually, each belt must be provided with its own drive. Electric hub motors can particularly advantageously be used in this connection. Such motors can be integrated into the deflection rollers of the individual conveyor belts and therefore do not require additional space. In particular in the case of transporting devices with a number of circulating conveyor belts arranged in parallel, the necessary drive power is distributed onto a number of the hub motors, with the result that the power requirements for each individual one of the hub motors are lower. Hub motors which are operated at a voltage of less than 50 V, e.g. 48 V, are therefore sufficient to provide the required drive power. Such hub motors then additionally have the advantage that, because of these low voltages, the operational safety for the operator is increased. Due to bottles rupturing, leakages of liquids, which also always represent a safety risk for the maintenance staff when high-voltage motors are used, often occur in transporting apparatuses.

The at least one lifting device can have any desired control elements or control members known to a person skilled in the art, via which the height of the webs and/or transporting devices can be controlled. Mechanical, electromotive, magnetic, pneumatic or hydraulic control elements can preferably be used here. A lifting device can have any desired number of control elements, which can be arranged distributed over the length of the transporting device. The control elements are preferably individually actuatable, with the result that the height of the transporting device is alterable in portions. An angle in the transporting direction between the transporting surface and the supporting plane defined by the webs is further preferably settable at least in portions. The objects are thereby pushed, so to speak, onto a slanting plane, whereby they are additionally decelerated.

The webs or transporting devices are preferably controlled by at least two control members, with the result that a simultaneous height alteration and tilting of the respective elements in the transporting direction is possible. The lifting device can additionally also be designed such that a tilting of the supporting plane transverse to the transporting direction is made possible. For this, for example, the webs can be actuated in groups via a total of four control elements, wherein in each case one control element is provided on either side of the transporting device and in each case at the front and rear ends. Through a tilting transverse to the conveying direction, the objects can be accumulated on one side of the transporting apparatus, which can in particular be utilized in the formation of multi-track container streams.

One end of the web or of the transporting device can also be mounted rotatably, with the result that then, in each case, only one lifting device is required, with which merely a tilting of the webs or transporting device relative to each other is then possible. If the rotatably mounted end is arranged sufficiently clearly underneath the transporting plane, the intersection line between the transporting plane and the supporting plane can also be adjusted, in this configuration, over a wide area of the transporting apparatus. In this case, however, the angle between the transporting plane and the supporting plane then cannot be adjusted independently of the position of the intersection line.

The lifting devices can move either the transporting devices or the webs. For the sake of simplicity, in this document, the lifting devices are usually described only in connection with either the webs or the transporting devices. However, this is not to be understood as limiting the present invention. A person skilled in the art is aware that the described lifting devices can be used both to position the webs and to position the transporting device.

Advantageous lifting devices comprise for example eccentric rods which can be arranged, for example, underneath the webs. By rotation of the eccentric rods, the height of the webs or transporting devices can then be varied.

Alternatively, the lifting devices can also be circulating belts with a thickening or tongue. These circulating belts are arranged underneath the webs and are moved over their own deflection rollers. By rotation of the deflection rollers, the thickened area or the tongue of the additional belt can be positioned under the web, with the result that the web is thereby raised by a predetermined amount.

A further possibility for a lifting device is, for example, a screw with a control element arranged under the web. By rotation of the screw, the control element is moved in terms of height corresponding to the incline and the diameter of the screw.

The present invention can particularly advantageously be used in the operation of wide conveyor sections on which the objects are transported in multiple rows. The width of the individual transporting devices is advantageously approximately the same size in each case. However, transporting devices with different widths can also be combined with each other. Transporting apparatuses according to the invention will usually have transporting devices and webs in alternating sequence, wherein the objects in each case stand either on the webs or on the transporting devices. In order that the objects nevertheless stand securely on the transporting apparatus at all times, the width of the transporting devices and webs should be at most 50% of the width or of the cross section of the base of the objects to be transported. The smaller the width of the transporting devices and webs relative to the objects to be transported, the greater the stability of the objects.

The width of the transporting devices and webs should therefore further preferably be less than 30%, and still more preferably less than 20% of the width of the base of the objects to be transported. Typical drinks bottles used today have a substantially cylindrical shape and a base diameter of from approximately 5 cm to 12 cm. The width of the conveyor belts should therefore be less than 6 cm, preferably less than 5 cm and further preferably less than 3.5 cm and particularly preferably approximately 1.5 cm to 2 cm. In principle, it is true that the objects stand better and more stably if the conveyor belts or webs are narrower, as then the objects always stand on and are transported by several conveyor belts or webs at the same time. For technical reasons, the conveyor belts cannot be designed with any desired narrowness. The webs on the other hand can have very small widths, because of their simple structure. The webs can be as narrow as 1 mm and preferably have approximately a width of 5 mm.

The webs can be actuated together, in groups or individually. The webs can in principle have any desired length, as long as this is at least twice the largest diameter of the base of the objects. The webs can, for example, have a length of between 0.3 m and 5 m, preferably of between 0.5 m and 2 m. In order that there are no steps during the transition from the transporting devices to the webs, the webs preferably form a slanting plane, onto which the objects are slid. Alternatively or additionally, the webs can also be provided with downwardly inclined guide plates on the front sides, with the result that a step-free sliding of the objects is also made possible when the webs are movable only in parallel to the transporting plane.

The upper sides of the webs can have any desired cross-sectional profile. The upper sides can be designed flat, triangular, rounded, trapezoidal or faceted. In particular if the objects are also to be shifted over the webs transverse to the transporting direction, it is recommended to select the profile of the webs such that a formation of steps relative to the transporting devices is prevented.

The lifting devices are preferably vertically movable in a step-free manner, with the result that not only can the two extreme points of the control, thus "control element fully extended" and "control element fully lowered", be set, but any desired intermediate settings are also possible. The objects can thereby, for example, be raised so slightly above the transporting plane that the strength of the friction between the objects and the conveyor belts, and the corresponding drive force acting on the objects can be altered continuously. The objects can thus be decelerated and accelerated in a targeted manner, wherein the danger of the objects tipping over is largely reduced.

By means of the control elements, both the vertical position of the transporting plane of the transporting device relative to the supporting plane defined by the webs and the gradient angle between the transporting plane and the supporting plane can be set. In addition, the horizontal position of the intersection line between the transporting plane and the supporting plane can also be shifted along the transporting direction. The intersection line defines the area in which the objects being transported standing are shifted from the transporting device onto the webs, or from the webs onto the transporting device.

The invention can be advantageously used in particular to implement a variable accumulation section. By a targeted adjustment of the control members, it is possible not only to alter the relative vertical positioning and the angle between the transporting plane and the supporting plane, but in addition also to freely choose the length of the accumulation section defined by the webs. Both the deceleration behaviour and the capacity of the accumulation section can thus be simply adapted to a respectively predefined transport task. In particular in the case of disruptions in the operating procedure, the flow of containers can be temporarily increased or reduced by targeted adjustment of the accumulation section.

In real systems, the accumulation end of a group of containers moves around depending on the quantity of objects supplied and removed and is thus subjected to constant fluctuation. A substantial advantage of the invention is that the horizontal position of the intersection line between the transporting plane and the supporting plane is adjustable along the transporting direction and can always be re-adjusted such that it lies in the area of the accumulation end. In this way, the objects are then conveyed on the transporting device until they arrive close to the accumulation end. There the objects are then pushed onto the supporting plane and decelerated, with the result that collisions among the conveyed objects can be largely prevented during the accumulation.

The webs can preferably be provided with special coatings, with the result that the friction coefficient of the webs can be defined and adapted to the respective transport requirements.

The surface of the upper side of the webs can also have a profiling, with the result that a friction force directed laterally corresponding to the profile can be exerted on the objects to be transported. The profiling preferably consists of diagonal strips of a coating with increased friction, wherein the strips are arranged at an angle diagonal to the transporting direction. Instead of strips, the webs can also have diagonal slots in the surface. The direction of the profiling then indicates in which direction the objects are deflected. The profile can also change along the webs, with the result that differing deflection behaviour is achieved over the length of the webs. It is also possible to arrange two height-adjustable webs with different profiles next to each other. Depending on the respectively required deflection, a decision can then be made as to whether only one or both webs are to be extended.

The webs are preferably provided in such a way that they sag slightly under their own weight and/or under the weight of the transported objects. The resulting radius of curvature of the webs depends on a plurality of parameters, such as the cross section and the length of the webs, the material used and the weight of the objects to be transported. Because of the sagging the angle forming between the transporting plane and the supporting plane is made smaller in the area of the intersection line, which can be utilized for a gentler transition of the objects from the transporting device onto the webs.

The transporting apparatus can also have horizontally movable control elements, with which the webs and/or transporting devices can be moved transverse to the conveying direction. The transporting apparatus, in particular the distance between the individual webs and/or transporting devices, can thereby be adapted variably to the size of the objects to be transported.

The webs can serve to raise the containers to be transported completely off the transporting apparatus. Such webs can be advantageously used, in particular, in multi-lane accumulation sections. During the accumulation of the objects, namely substantial pressures and, due to the friction of the conveyor belts running under the backed-up objects, high tensile loads, which act both on the belt and on the drive device, result at the output of the accumulation sections. The prevention of these friction losses leads to numerous advantages over conventional systems. A considerable energy saving can be achieved. No lubricant, or at least much less lubricant, need be used and the lifespan of the individual components can be increased.

In a further embodiment, the transporting surface of the transporting device can have a grooved surface, with the result that the transporting plane is formed by the upper sides of comb-like structures running in the transporting direction. The width of the comb-like structures and the grooves running between the comb-like structures is in principle freely selectable and can be only a few millimeters. The webs are formed such that they extend inside the grooves between the comb-like structures of the transporting device. The webs preferably extend in the transporting direction until they are above the transporting device, and are connected to each other at their front and rear ends. The webs then form a grill-like structure, through which the comb-like structures of the transporting device can extend.

Because of the small width of the comb-like structures of the transporting device and the webs, in this embodiment a plurality of objects with different sizes can be conveyed. The size limitations of the conveyor devices and webs indicated above in connection with other embodiments do not apply to this embodiment. The present invention also relates to a corresponding method for transporting objects and for controlling the flow of containers, with at least one transporting device which has a conveying speed, with at least one web which is arranged in parallel to the at least one transporting device, wherein the upper side of the web defines a supporting plane, wherein the web has a length which corresponds to a multiple of the diameter of the base of the objects to be transported, and wherein the tilt of the supporting plane of the web relative to the transporting plane of the at least one transporting device is altered by means of a lifting device. The lifting device makes a step-free tilting of the web and/or of the transporting device possible, with the result that the horizontal position of an intersection line between the supporting plane and the transporting plane is adjustable in a step-free manner. The present invention can advantageously be used in various fields of container-flow control. For example, in conveyor systems, accumulation sections are often required, on which objects to be transported can accumulate in several parallel lanes. Between the conveyor belts and the objects backed up thereon, high friction losses occur which lead to increased tensile loads of the conveyor belts and drive motors. With the transporting apparatus according to the invention, the backed-up objects can be raised off the continuously moving first conveyor device. With the apparatus according to the invention, the horizontal position of the intersection line between the transporting plane and the supporting plane is adjusted such that it lies approximately in the area of the accumulation end of the objects already accumulated on the supporting plane. The objects are then conveyed on the transporting device until they reach the accumulation end. At the accumulation end, the objects are then decelerated by being gently slid onto the supporting plane, and line up against the already accumulated objects. As the position of the accumulation end changes constantly, for optimal operation the precise alignment of the supporting plane, as well as the position of the intersection line between the transporting plane and the supporting plane, must likewise be continuously re-adjusted. Various systems are known to a person skilled in the art for detecting the accumulation end. In an expedient embodiment, the accumulation end can be detected via light barriers. In addition, the conveyor section can also be monitored with cameras and the accumulation end can be determined by analysis of the camera images. The control of the webs can also be effected depending on the power input of the drive devices. More containers accumulating on an accumulation section causes more friction between the transporting devices and the container bases. However, as the frictional resistance increases, the power input of the drive devices also increases, with the result that the power input represents a measure of the length of the container accumulation on the transporting plane. If the power input exceeds a threshold value, the webs can then be extended, whereby the containers already accumulated in this area are raised off the transporting plane. At the output of accumulation sections, the multi-track container stream usually has to be formed into a single-track container stream again. During this forming, the containers are, for example, pushed by curved side rails, transverse to the transporting direction, onto a faster running extracting transporting device. In order to support the transverse shifting, the transporting devices can be arranged in a terraced manner in the output area of the accumulation section, with the result that a downward slope forms in the direction of the extracting transporting device and gravity supports a sideways shifting of the objects. In order that the webs do not form step edges during the transverse shifting of the objects over the transporting devices, it is recommended to use webs which have a rounded or faceted profile on their upper side. In addition, it is advantageous if the webs are individually actuatable, as then the webs can be adapted individually to the respective operating state.

A further field of use of the present invention is the separating, free of dynamic pressure, of objects transported in groups. To date, for this, a multi-track container stream is guided onto an acceleration area on which in each case the front-most row of containers is released offset in time. The row of containers is then guided along a long rail, against which the containers ideally arrange themselves one behind the other and form a single-track container stream. The containers here are not guided, and again and again it happens that two containers run next to each other onto the rail and cannot arrange themselves one behind the other without help. With the present invention, this method can be better monitored by controlling individual containers by targeted lowering of the webs or transporting devices and releasing them one after the other onto a discharging transporter. With the control, it can be ensured that the objects are in each case released individually, and that a simultaneous release of two containers is prevented. The containers can therefore be formed into a single-track stream against a comparatively short rail.

In a further embodiment of the present invention, the transporting apparatus can also consist of a relatively wide web, which is arranged centrally between two relatively narrow transporting devices. The width of the web and of the conveyor belts is chosen such that an object to be transported can stand or be conveyed securely both on the supporting plane defined by the web and on the transporting plane defined by the transporting devices. The web and the transporting devices arranged on its sides can form a component assembly. By parallel arrangement of several such component assemblies, a transporter of any desired width can then be formed.

Features which are described in connection with individual embodiments can also be realized in other embodiments, unless otherwise indicated.

BRIEF DESCRIPTION OF THE DRAWINGS

Embodiment examples of the invention are explained below with reference to the drawings. There are shown in.

DETAILED DESCRIPTION

Figure 1:
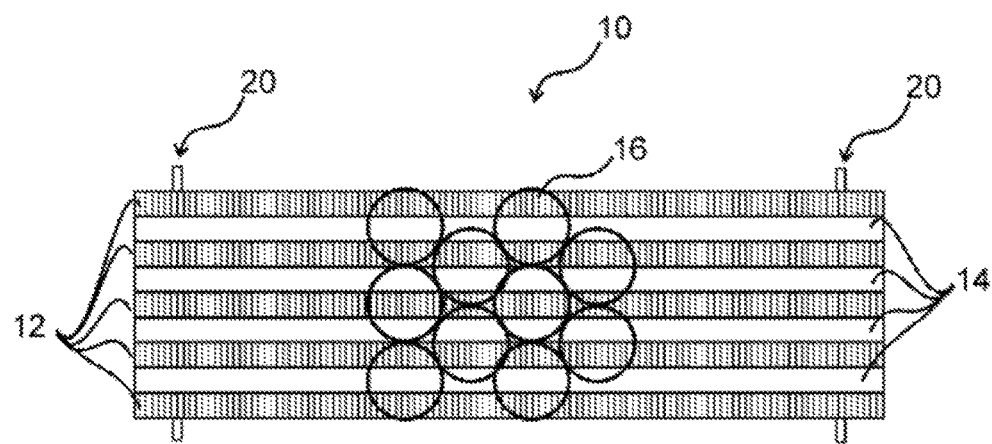
FIG. 1 a top view of a transporting apparatus with height-adjustable webs and fixed transporting devices arranged in alternation.

FIG. 1 shows a portion of a transporting apparatus 10 with several transporting devices 12 arranged in parallel, on which a plurality of objects 16 are transported. In this example, the transporting devices 12 are circulating conveyor belts, and the objects 16 are drinks bottles. Instead of conveyor belts, however, link chain conveyors or other suitable transporting devices can be used just as well.

Between the conveyor belts 12, height-adjustable webs 14 are arranged which are vertically movable via lifting devices 20.

The lifting devices 20 in FIG. 1 are two eccentric rods, which are provided at the respective end areas of the webs 14 and via which all webs 14 are coupled to each other. By rotation of the eccentric rods 20, the webs 14 are raised or lowered. If both eccentric rods are moved uniformly, the webs 14 are moved in parallel to the transporting plane defined by the transporting devices 12. By selective movement of only one of the two eccentric rods, the webs 14 can be tilted relative to the transporting plane.

Figure 2:
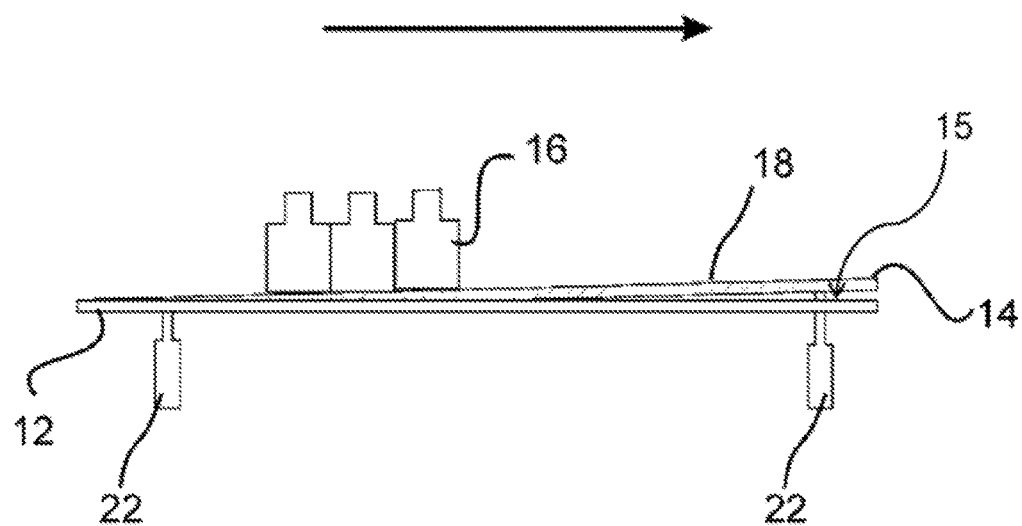
FIG. 2 a cross-sectional view of a transporting apparatus with height-adjustable transporting devices and height-adjustable webs.

A side view of a transporter which likewise has parallel transporting lanes 12 and height-adjustable webs 14 in alternating sequence is shown in FIG. 2. In the side view, in each case, only one conveyor belt 12 and one height-adjustable web 14 are represented. Of course, however, any desired number of conveyor belts 12 and webs 14 can be arranged in any desired, preferably alternating sequence. The actual arrangement and number of conveyor belts 12 and webs 14 used depends on the respective intended use. The bottles 16 are conveyed from left to right, as indicated by the arrow in FIG. 2.

In FIG. 2, the webs 14 are positioned over two pneumatic control elements 22, which are provided in each case at the end areas of the webs 14. The upper sides of the webs 14 define a supporting plane 18. In the configuration shown in FIG. 2, the two control elements 22 are extended to different extents, with the result that the supporting plane 18 is slightly tilted relative to the transporting plane. In the configuration shown in FIG. 2, the bottles 16 are slid onto the supporting plane 18 defined by the webs. The tilting makes it possible to slide the bottles 16 very gently onto the webs 14. The sliding is preferably a dynamic process, in which both the tilt angle and the extension height of the individual control elements can be adapted to the respective current transporting requirements.

To release the bottles 16, the webs 14 are then lowered at least at the end located downstream, with the result that the bottles 16 can then be deposited on the transporting apparatus 10 and transported further. In particular during the release, it is advantageous if the individual webs have their own control elements individually, with which the webs can be selectively moved. In this way, in each case a particular bottle can be released in a targeted manner for further transport.

As the bottles 16, as long as they stand on the webs 14, are not in contact with the conveyor belts 12, no friction also forms between the bottles 16 and the conveyor belts 12, with the result that with this embodiment, in particular in the implementation of accumulation sections, a substantial energy saving can be achieved.

Figure 3:
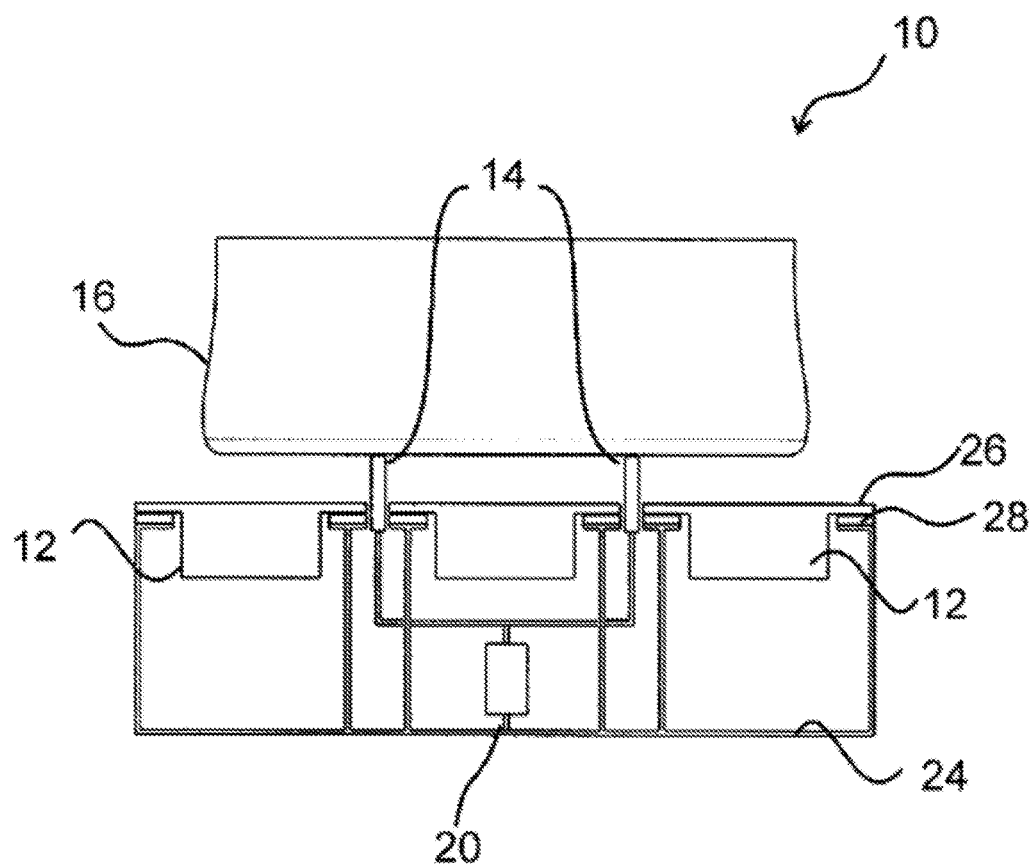
FIG. 3 a side view of the transporting apparatus from FIG. 2.

The transporting apparatus 10 is shown in a cross-sectional view transverse to the conveying direction in FIG. 3. The transporting apparatus 10 comprises three fixedly arranged transporting devices 12 and two height-adjustable webs 14, which are arranged in a frame structure 24. Each conveyor belt 12 has lateral shoulders 26, with which the conveyor belts 12 lie on bearing surfaces 28 of the frame structure 24.

The two webs 14 can be moved in terms of height via a control member 20. In the configuration shown in FIG. 3, the control member 20 is extended, with the result that the supporting plane 18 of the webs protrudes above the transporting plane. The bottle base of the bottle 16 to be transported therefore stands exclusively on the webs and is not conveyed further in this situation.

In order that the bottle stands securely on the conveyor belts 12 and webs 14, the width of the conveyor belts 12 is approximately 40% of the diameter of the bottle 16 to be transported. The webs are designed significantly narrower in comparison.

Figure 4:
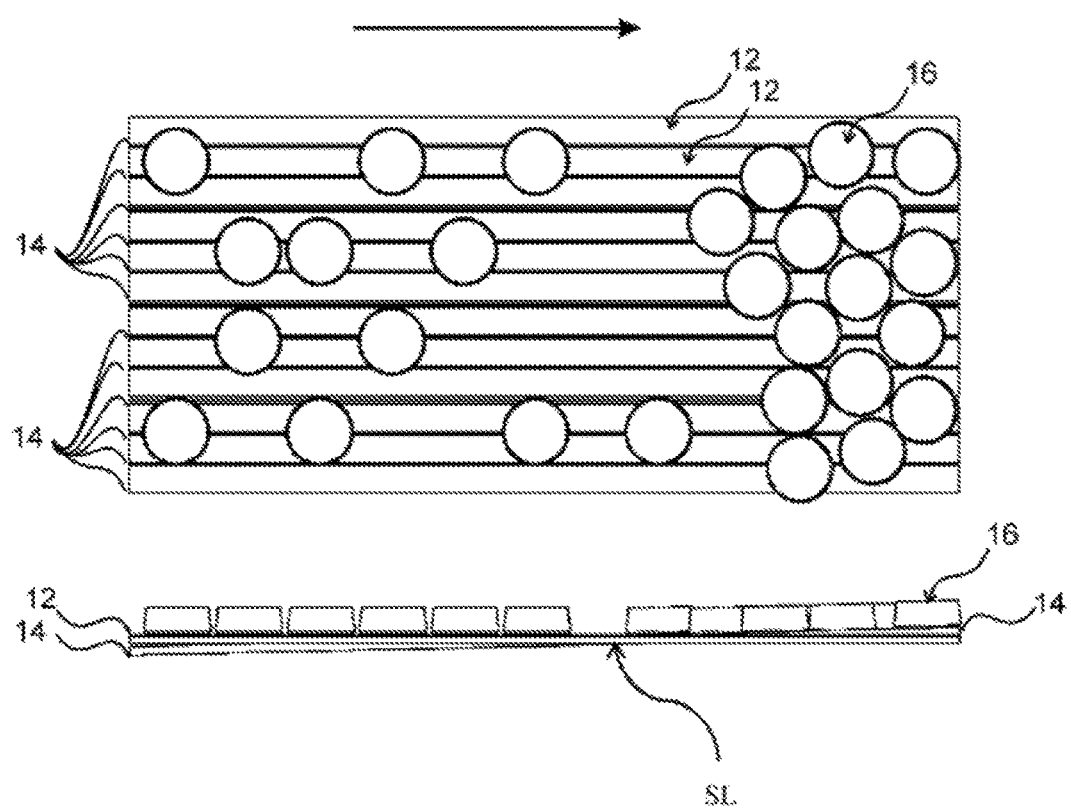
FIG. 4 a top view and a side view of an accumulation section with adjustable webs.

In FIG. 4, an accumulation section is depicted for which the use of the webs 14 is particularly suitable. Accumulation sections are often required in filling systems in order to make intermediate storage of containers 16 possible during disruptions in the production sequence, with the result that units arranged upstream can continue to be operated despite the disruption. On accumulation sections, the containers 16 are held back in multiple tracks. In conventional systems, the conveyor belts 12 are pulled through under the accumulated containers 16, which leads to considerable friction losses, in particular if a large number of containers 16 are to be accumulated. In order to reduce these friction losses, in the accumulation section in FIG. 4 height-adjustable and tiltable webs 14 are provided, which are arranged in alternating sequence between the individual transporting devices 12. It can be seen from the side view in FIG. 4 that the webs 14 are tilted relative to the transporting plane, with the result that the conveyed containers 16 are slid gently onto the supporting plane 18 formed by the webs 14 in the central transition area. The height of the webs 14 is chosen such that the containers 16 located at the end of the webs 14 located downstream, which are already accumulated, are raised completely off the transporting plane.

In the case of increasing filling of the accumulation section, the height and/or the tilt of the webs 14 is adjusted such that in each case the conveyed containers can be slid onto the webs, and that the already accumulated containers 16 are raised completely off the transporting plane. The horizontal position of the intersection line between the transporting plane and the supporting plane is ideally adjusted such that it lies approximately in the area of the accumulation end of the objects already accumulated on the supporting plane. The objects are then conveyed on the transporting device until they reach the accumulation end. At the accumulation end, the objects are then decelerated by being gently slid onto the supporting plane, and line up against the already accumulated objects. As the position of the accumulation end changes constantly, for optimal operation the precise alignment of the supporting plane, as well as the position of the intersection line between the transporting plane and the supporting plane, must likewise be continuously re-adjusted.

The configuration shown in FIG. 4 represents the start of the accumulation development. In the case of complete accumulation, the rotationally symmetrical containers arrange themselves according to a 2-dimensional, cubic close-packing. As can be seen in FIG. 4, the intersection line SL is located in the area of the accumulation end of the group of bottles already accumulated on the webs 14. As the accumulation length increases, the intersection line can be shifted in the direction of the end of the transporting device lying upstream. By adjustment of the height and of the tilt of the webs 14, the intersection line SL is always updated to the current position of the accumulation end.

Figure 5:
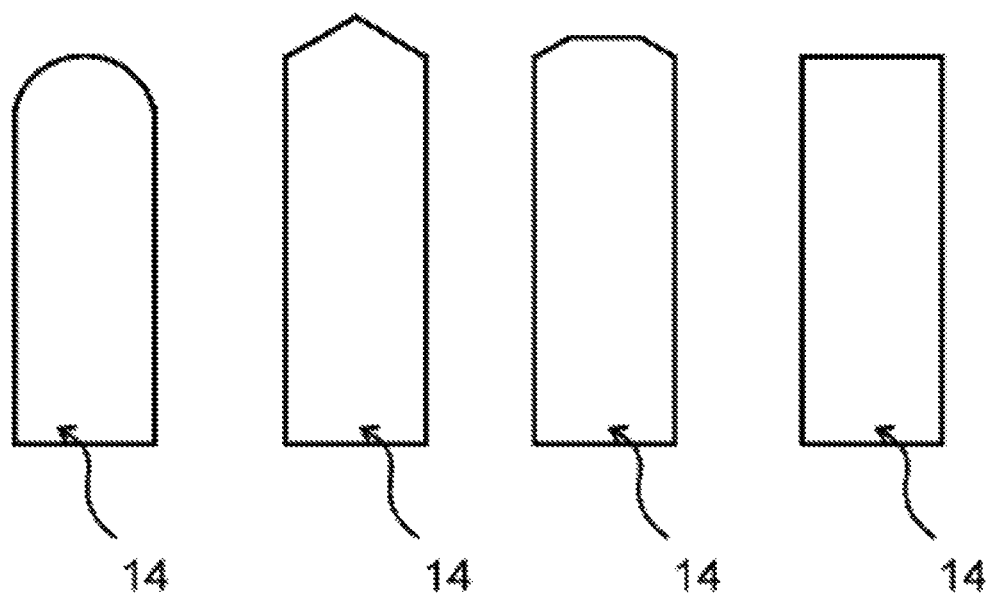
FIG. 5 various web profiles.

At the end of the accumulation sections located downstream, it is often necessary to form the multi-track container stream into a single-track container stream. For this, at the end of the accumulation section located downstream, guide plates (not represented) are provided which typically guide the containers 16 in the direction of a boundary rail of the transporting apparatus 10. During this forming, the containers 16 are also shifted with a component transverse to the transporting direction on the transporting apparatus 10. However, in the arrangement of FIG. 4, this also means that the containers 16 have to be pushed transversely over the possibly slightly elevated webs 14. Webs 14 with a rectangular profile would act like step edges, and could cause the containers 16 to tip over. In order to prevent such a tipping over, the webs 14 expediently have a rounded or faceted profile. Possible profile shapes for the upper sides of the webs 14 are depicted in FIG. 5.

Figure 6:
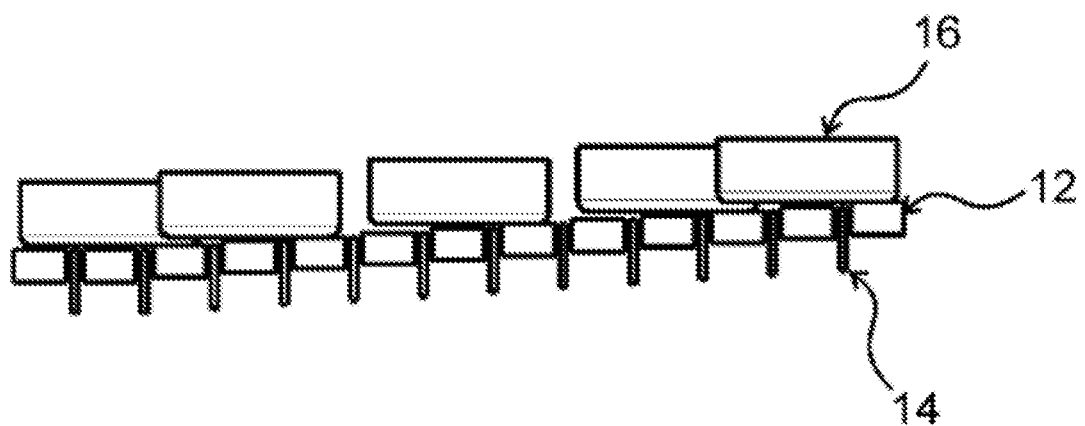
FIG. 6 a cross section of an accumulation section according to FIG. 4 with transporting devices and webs arranged in a terraced manner.

During the forming of a multi-track container stream, the transporting devices 12 arranged in parallel are often arranged in a terraced manner and/or with an angle of inclination, in order to support the transverse movement of the containers 16 relative to the transporting plane on the basis of gravity. A terraced arrangement can also be achieved with the present invention, as represented in FIG. 6. There, a cross-sectional view is shown, wherein height-adjustable webs 14 are again provided between the individual transporting devices 12. The transporting devices 12 arranged lying lower down are usually operated at a higher speed, in order to transport all of the accumulated containers 16 away quickly on these transporting devices 12. By targeted individual adjustment of the height of the webs 14 between the transporting devices 12 arranged in a terraced manner, a supporting plane sloping down transversely to the transporting direction is defined, on which the containers 16 move during the forming. In the arrangement according to FIG. 6 as well, it is recommended to choose one of the rounded or faceted profiles for the webs 14.

Figure 7:
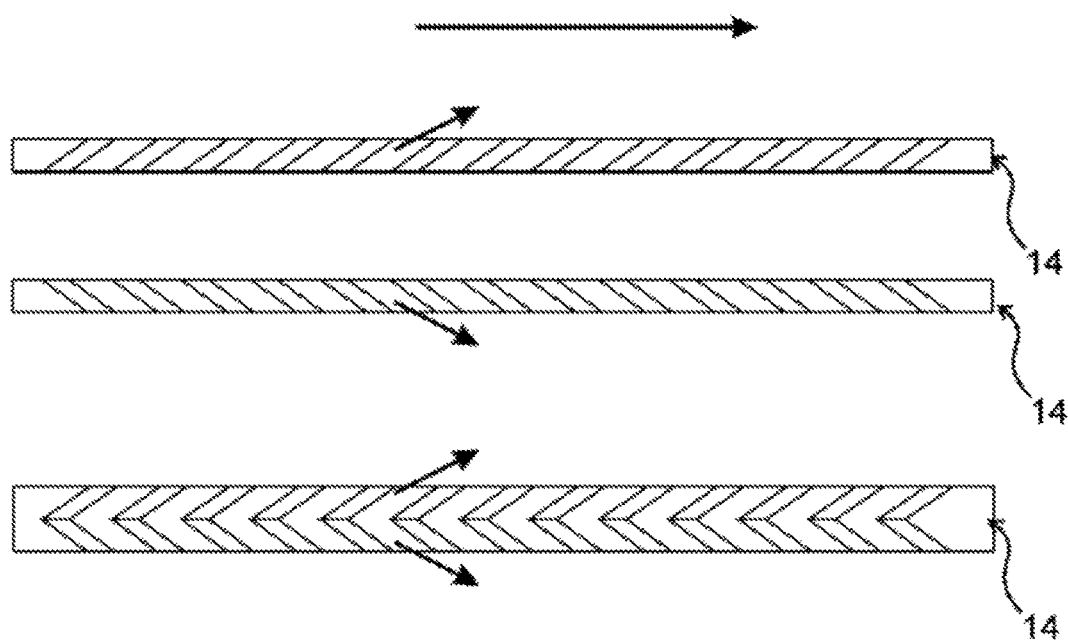
FIG. 7 various friction profiles of the web upper side.

In FIG. 7 upper sides of webs are depicted which each have a different friction profile. The friction profile can consist, for example, of strips of a friction coating. The profile can also be formed by slots arranged diagonally. If the webs are extended only so far that, although the objects are still conveyed, a friction is generated between the surface of the webs and the objects, then a deflection of the objects can be achieved due to the friction profile. The direction of the friction profile indicates in which direction the objects to be transported are deflected. The deflection direction is represented by the respective arrows in FIG. 7.

Figure 8:
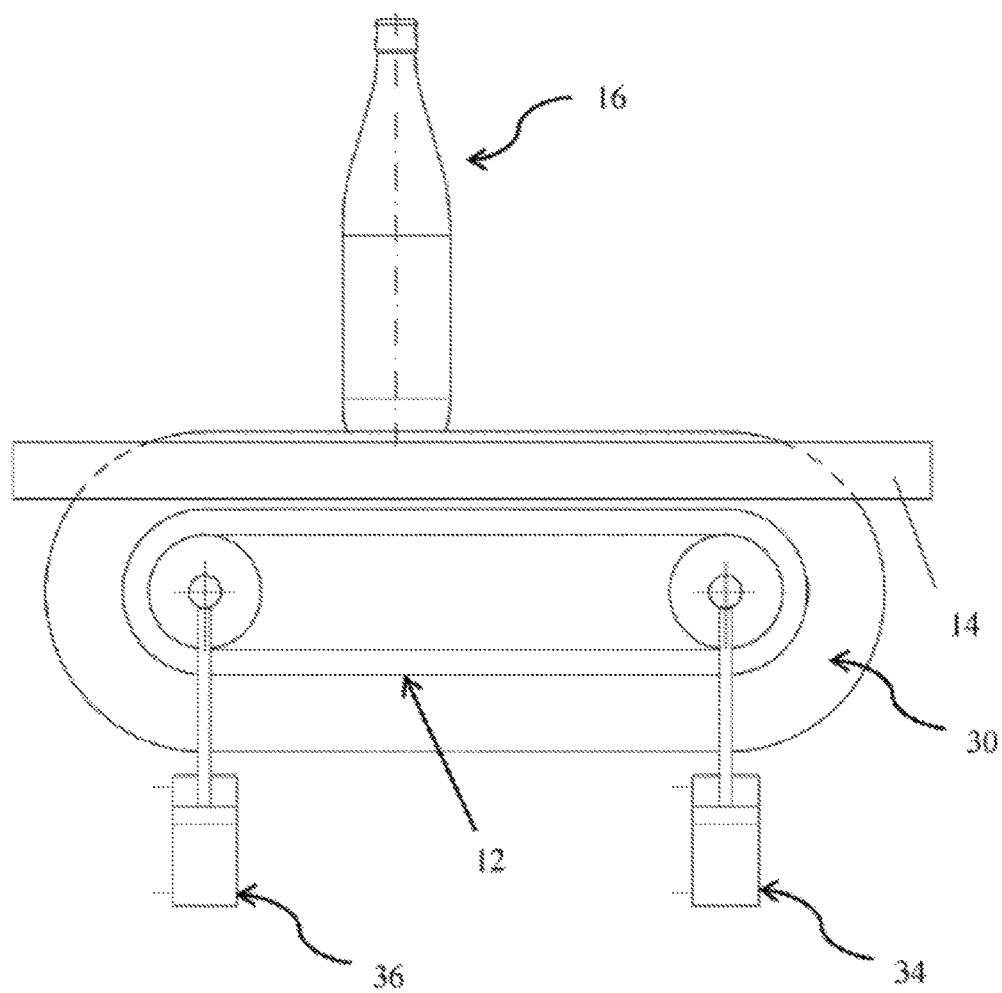
FIG. 8 a side view of an embodiment with a transporting device with comb-like structures.
Figure 9:
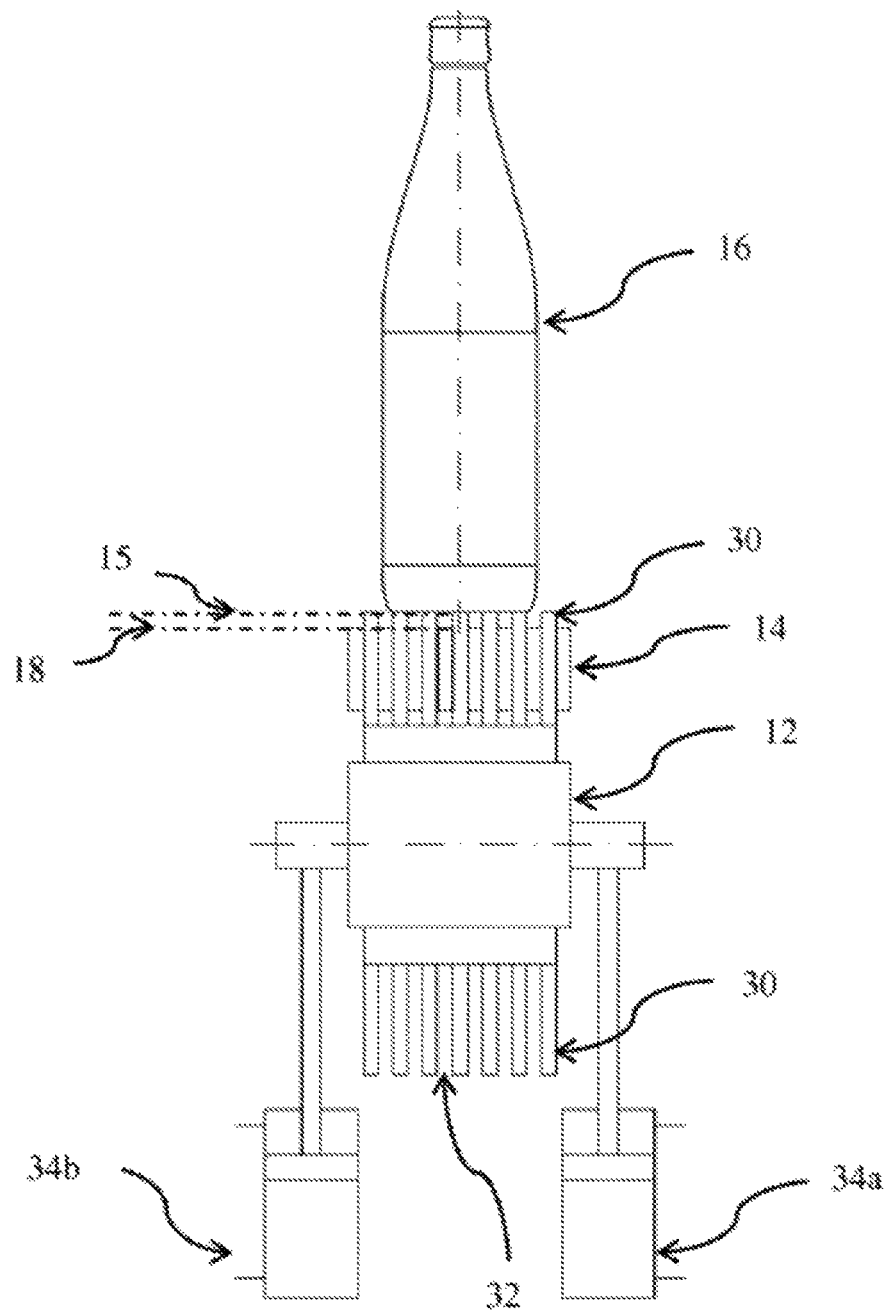
FIG. 9 a front view of the embodiment according to FIG. 8.

In FIGS. 8 and 9 a further embodiment of the invention is depicted, in which the transporting device 12 has comb-like structures 30, the upper side of which forms the transporting plane 15 for the objects 16 to be transported. The webs 14 in this embodiment are stationary and are arranged in the intermediate spaces 32 between the comb-like structures 30 of the transporting device 12. The transporting device 12 is designed height-adjustable via the control elements 34a, 34b, 36a, 36b, which are provided in each case at the front and rear deflection rollers of the transporting device 12. In FIGS. 8 and 9 the control elements 34a, 34b, 36a, 36b are adjusted in such a way that the transporting plane 15 is located in parallel above the supporting plane 18 defined by the webs 14. In this configuration, the objects 16 are conveyed on the transporting device 12 without being influenced by the webs 14. The positioning of the transporting plane 15 of the transporting device 12 is adjustable by the total of four independently actuatable control elements 34a, 34b, 36a, 36b. By lowering of the front 34a, 34b or rear 36a, 36b control elements, the transporting plane 15 of the transporting device 12 can be moved in terms of height and/or tilted relative to the supporting plane 18, wherein the comb-like structures 30 are lowered between the webs 14, with the result that objects 16 are deposited on the supporting plane 18 defined by the webs 14 in portions or over the entire length of the transporting device 12. Not only are the relative vertical positioning and the angle between the transporting plane 15 and the supporting plane 18 adjustable, but the horizontal position of the intersection line between the transporting plane 15 and the supporting plane 18 can also be altered. In the case of accumulation sections, for example, the transporting device can thus always be precisely positioned such that the intersection line is located in the area of the accumulation end.

LIST OF REFERENCE NUMBERS

| | |
|---|---|
| 10 | transporting apparatus |
| 12 | transporting device |
| 14 | height-adjustable web |
| 15 | transporting plane |
| 16 | object |
| 18 | supporting plane |
| 20 | lifting device |
| 22 | pneumatic control elements |
| 24 | frame structure |
| 26 | lateral shoulders |
| 28 | bearing surfaces |
| 30 | comb-like surface structures |
| 32 | intermediate spaces |
| 34a, b | front control elements |
| 36a, b | rear control elements |

The invention claimed is:

1. An apparatus for transporting standing objects, such as containers, bottles, multipacks and packaged items, comprising:
    at least one conveyer belt, which has a first conveying speed and defines a transporting plane for the standing transport of the objects in a transporting direction,
    a first web and a second web, which are arranged in parallel to and on opposite sides of the conveyer belt, wherein an upper side of the first web and an upper side of the second web define a supporting plane and wherein the first web and the second web are stationary relative to the conveyer belt in the transporting direction, and
    a lifting device with which an elevation of at least one of the first web and the second web can be increased so as to tilt the supporting plane transverse to the transporting plane of the conveyer belt,
    wherein the lifting device comprises control elements, which are provided at the front and at the rear end of the webs and/or conveyer belt and which make vertical positioning of the respective ends of the webs and/or conveyer belt possible, with the result that the horizontal position of the intersection line between the supporting plane and the transporting plane, as well as the angle between the supporting plane and the transporting plane are adjustable independently of each other.

2. The apparatus according to claim 1, wherein the speed of the at least one conveyer belt is adjustable.

3. The apparatus according to claim 1, comprising a plurality of conveyer belts and webs, which are in each case arranged in alternating sequence transversely to the transporting direction, wherein the width of the conveyer belts in each case is approximately the same size and smaller than 50% of the width of the base of the objects to be transported.

4. The apparatus according to claim 1, comprising a plurality of conveyer belts and a plurality of height-adjustable webs arranged between the conveyer belts, wherein the webs are movable in terms of the vertical position individually or in groups via their own lifting devices in each case.

5. The apparatus according to claim 1, wherein the lifting device has mechanical, electromotive, pneumatic or hydraulic control elements.

6. The apparatus according to claim 1, wherein the lifting device, at the front and/or rear end of the webs, has eccentric rods, with which the vertical position of the webs relative to the transporting plane of the at least one conveyer belt can be adjusted.

7. The apparatus according to claim 1, wherein the at least one conveyer belt has comb-like surface structures, the upper side of which defines the transporting plane, and wherein the webs extend between the comb-like surface structures in the transporting direction.

8. A method for transporting standing objects, such as containers, bottles, multipacks and packaged items, comprising:
   at least one conveyer belt, which has a conveying speed and defines a transporting plane for the standing transport of the objects,
   at least one web, which is arranged in parallel to the conveyer belt, wherein the upper side of the web defines a supporting plane, and wherein the web has a length which corresponds to at least twice the diameter of the base of the objects to be transported, and
   wherein the tilt of the web relative to the conveyer belt can be altered by means of a lifting device so as to adjust the horizontal position of the intersection line between the supporting plane and the transporting plane,
   wherein the lifting device makes vertical positioning of the web possible, with the result that the horizontal position of the intersection line between the supporting plane and the transporting plane and the tilt angle between the supporting plane and the transporting plane are adjustable independently of each other.

9. The method according to claim 8, wherein the supporting plane defined by the web is tilted relative to the transporting plane of the at least one conveyer belt at least in portions in the transporting direction, with the result that the objects are slid onto the supporting plane and raised off the at least one conveyer belt.

10. The method according to claim 8, wherein the horizontal position of the intersection line between the supporting plane and the transporting plane is in each case updated corresponding to a current accumulation of standing objects already accumulated on the transporting apparatus.

11. The method according to claim 10, wherein, in addition to the horizontal positioning of the intersection line, the angle which results between the supporting plane and the transporting plane can also be set to a predefined value.

12. An apparatus for transporting standing objects, such as containers, bottles, multipacks and packaged items, comprising:
   at least one conveyer belt, which has a first conveying speed and defines a transporting plane for the standing transport of the objects in a transporting direction,
   a first web and a second web, which are arranged in parallel to and on opposite sides of the conveyer belt, wherein an upper side of the first web and an upper side of the second web define a supporting plane and wherein the first web and the second web are stationary relative to the conveyer belt in the transporting direction, and
   a lifting device with which an elevation of the conveyer belt can be increased so as to tilt the transporting plane transverse to the supporting plane,
   wherein the lifting device comprises control elements, which are provided at the front and at the rear end of the conveyer belt and which make vertical positioning of the respective ends of the conveyer belt possible, with the result that the horizontal position of the intersection line between the supporting plane and the transporting plane, as well as the angle between the supporting plane and the transporting plane are adjustable independently of each other.

13. The apparatus according to claim 12, wherein the speed of the at least one conveyer belt is adjustable.

14. The apparatus according to claim 12, wherein the lifting device has mechanical, electromotive, pneumatic or hydraulic control elements.

15. The apparatus according to claim 12, wherein the lifting device has eccentric rods, with which the vertical position of the conveyer belt relative to the supporting plane can be adjusted.

16. The apparatus according to claim 12, wherein the at least one conveyer belt has comb-like surface structures, the upper side of which defines the transporting plane, and wherein the webs extend between the comb-like surface structures in the transporting direction.

* * * * *